United States Patent [19]
Kakiuchi et al.

[11] Patent Number: 5,567,346
[45] Date of Patent: *Oct. 22, 1996

[54] LATENT HEAT STORAGE MATERIAL COMPOSITION

[75] Inventors: Hiroyuki Kakiuchi; Masahiro Oka, both of Yokkaichi, Japan

[73] Assignees: Mitsubishi Chemical Corporation; Mitsubishi Petrochemical Engineering Co., Ltd., both of Tokyo, Japan

[*] Notice: The term of this patent shall not extend beyond the expiration date of Pat. No. 5,453,213.

[21] Appl. No.: 350,632

[22] Filed: Dec. 7, 1994

[30] Foreign Application Priority Data

Dec. 24, 1993 [JP] Japan ................. 5-354782

[51] Int. Cl.⁶ ........................................ C09K 5/06
[52] U.S. Cl. ................................ 252/70; 165/10
[58] Field of Search ..................... 252/70; 165/10 A

[56] References Cited

U.S. PATENT DOCUMENTS

| 4,689,164 | 8/1987 | Ames ........................ 252/70 |
| 5,453,213 | 9/1995 | Kakiuchi et al. ............. 252/70 |

FOREIGN PATENT DOCUMENTS

| 3209125 | 11/1982 | Germany . |
| 57-73069 | 5/1982 | Japan . |
| 59-113082 | 6/1984 | Japan . |
| 2-92988 | 4/1990 | Japan . |
| 94/04630 | 3/1994 | WIPO . |

OTHER PUBLICATIONS

JP-A-6 080958 (Mitsubishi Petrochemical Co. Ltd.) Database WPI—Week 9416, Derwent Publications, Ltd., London, GB, Mar. 22, 1994—Abstract.

JP-A-2 092 988 (Kubota KK) Database WPI—Week 9019, Derwent Publications, Ltd., London, GB, Apr. 3, 1990—Abstract.

JP-A-56 147 884 (Kaikin Kogyo KK) Database WPI—Week 8152, Derwent Publications, Ltd., London, GB, Nov. 17, 1981—Abstract.

*Primary Examiner*—Christine Skane
*Attorney, Agent, or Firm*—Armstrong, Westerman, Hattori, McLeland & Naughton

[57] ABSTRACT

The present invention relates to a latent heat storage material composition comprising 65 to 85 wt % of sodium sulfate decahydrate, 1 to 20 wt % of ammonium chloride and 1 to 20 wt % of sodium bromide, and optionally 1 to 20 wt % of ammonium sulfate. The composition has a melting point of 5° to 10° C., has large latent heat at the melting point and exhibits excellent long-term performance.

14 Claims, 1 Drawing Sheet

LATENT HEAT STORAGE MATERIAL COMPOSITION

BACKGROUND OF THE INVENTION

1. Field of the Invention

The present invention relates to a novel latent heat storage material composition suitable for use in air conditioning systems.

2. Description of the Prior Art

Heretofore, latent heat storage materials used in air conditioning systems which have melting points in the range of 5° to 10° C. have been considered useful. Examples of the known conventional organic compounds having melting points of around 5° to 10° C. include tetradecane ($C_{14}H_{30}$, melting point: 5° C.; Japanese Patent Publication No. 53-24182) and pentadecane ($C_{15}H_{32}$, melting point: 9.9° C.), etc., which are paraffinic compounds, and polyethyleneglycol #400 (melting point: 4° to 8° C.; Japanese Patent Application Laid-open No. 62-19968) and 1-decanol (melting point: 5° C.), etc., which are non-paraffinic compounds. However, these compounds are scarcely used now, as they have low thermal conductivity and a relatively low heat of melting.

On the other hand, several compositions of inorganic compounds have been reported which are composed of inorganic salt hydrates having large heat of melting and melting points of around 5° to 10° C. For example, a binary composition composed of disodium hydrogenphosphate dodecahydrate and dipotassium hydrogenphosphate hexahydrate (melting point: 5° C.; Japanese Patent Publication No. 52-11061) which has outstanding problems in the prevention of supercooling and, which therefore, has faced difficulties in practical use. A ternary composition composed of sodium sulfate decahydrate, ammonium chloride and ammonium bromide (Japanese Patent Publication No. 62-56912), which although it possesses a melting point of within the range of 6.3° to 10.1° C., is also not suitable for practical use because of its insufficient stability in long-term performance.

Another ternary composition composed of sodium sulfate decahydrate, ammonium chloride and sodium chloride is illustrated in Maria Telkes, SOLAR ENERGY STORAGE (ASHRAE JOURNAL, SEPTEMBER, 1974), but this composition has been known to have a melting point of 12.8° C. In addition, a ternary composition composed of sodium sulphate, water and ammonium chloride (Japanese Patent Application Laid-open No. 2-92988) has a melting point of within the range of 8.6° to 9.6° C.

The preferable melting point of latent heat storage materials used for air conditioning systems has been considered to be from 5° to 10° C., and more preferably from 5° to 8° C. However, when already installed air conditioning systems are used with insufficient cooling, a conventional water heat-pump (e.g. an absorption refrigerator) must also be used simultaneously. In this case, the possibility that the temperature of the obtained cooled water would be restricted to about 4° to 5° C. is great. The latent heat storage materials which are to be frozen by the cooled water of 4° to 5° C. should have freezing points of 7° to 8° C., and, from the view point that it is preferable to have a melting temperature which is as low as possible, the melting point of the latent heat storage materials should optimally be in the range of 10° to 13° C.

On the other hand, for newly-installed air conditioning systems, it would be ideal for the refrigerator not to be operated in the daytime, but rather for the cooling to be performed by using only the latent heat stored at night.

Many latent heat storage materials having melting points of 5° to 10° C. proposed heretofore are not used in practice due to any one of the following reasons of (1) small amounts of heat storage, (2) a large difference between a starting temperature of crystallization and a freezing point, (3) no heat recycling stability in long-term performance, (4) high costs, etc.

Accordingly, the object of the present invention is to provide a latent heat storage material composition suitable for use in air conditioning systems and satisfying conditions such as (1) having a melting point in the range of 5° to 10° C., (2) having a large amount of latent heat at the melting point, (3) exhibiting heat recycling stability in long-term performance and (4) possessing the capability for heat storage by water (freezing by cooled water of 1° to 2° C.).

SUMMARY OF THE INVENTION

Figure 1:
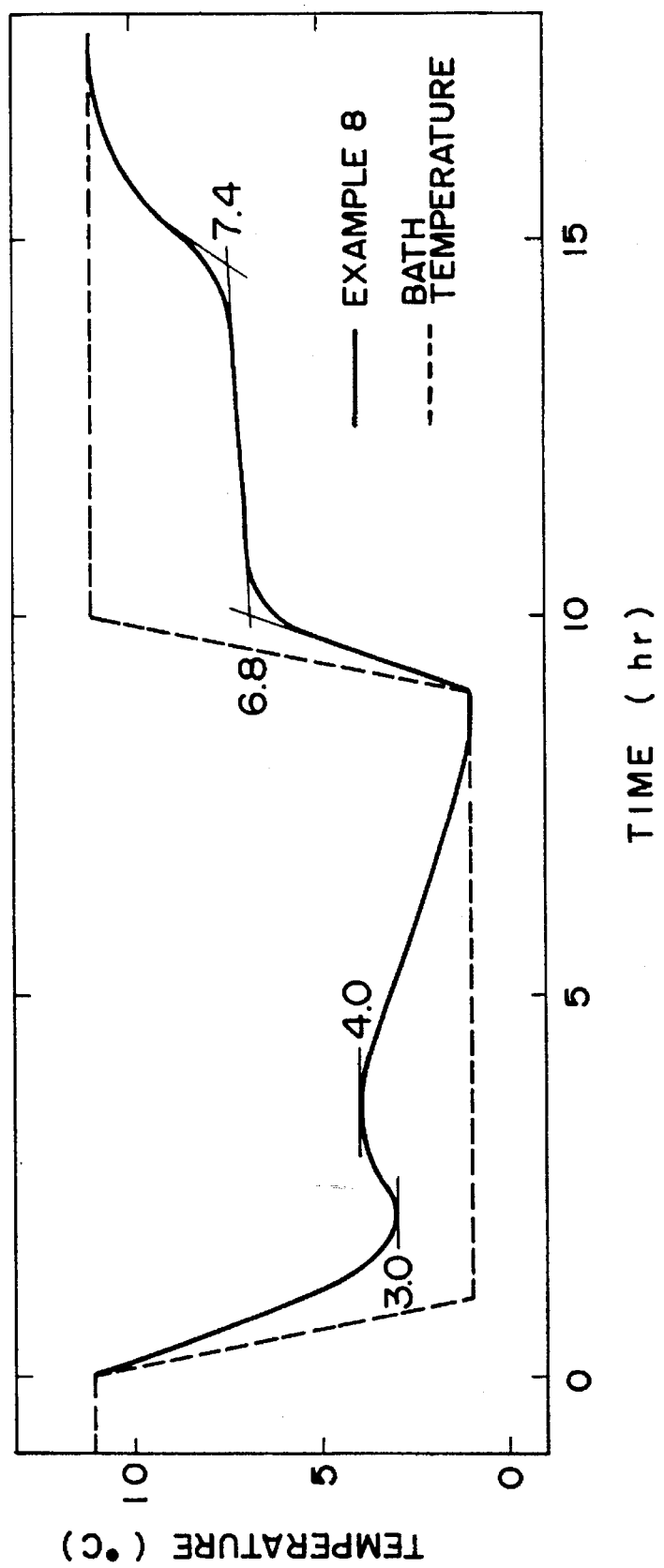
FIG. 1 is a graph showing the freezing/melting heat pattern of the latent heat storage material composition prepared in Example 8 according to the present invention.

According to the present invention, a latent heat storage material composition comprising 65 to 85 wt %, preferably 68 to 80 wt % of sodium sulfate decahydrate; 1 to 20 wt %, preferably 4 to 15 wt % of ammonium chloride; 1 to 20 wt %, preferably 4 to 15 wt % of sodium bromide and optionally 1 to 20 wt %, preferably 4 to 15 wt % of ammonium sulfate is provided.

Another aspect of the present invention is to provide a latent heat storage material composition as described in claim 1 comprising 0.1 to 10 wt % of at least one type of nucleating agent selected from the group consisting of sodium tetraborate decahydrate, silicate and cryolite, and 0.1 to 10 wt % of at least one type of thickening agent selected from the group consisting of carboxymethyl cellulose, attapulgite clay and water-insoluble hydrogels.

DETAILED DESCRIPTION OF THE INVENTION

The main component of the latent heat storage material composition according to the present invention is sodium sulfate decahydrate which has a melting point of 32.5° C. and latent heat of melting of about 60 cal/g. In the composition of the present invention, ammonium chloride, sodium bromide and optionally ammonium sulfate are blended with said sodium sulfate decahydrate as melting point controlling agents, in order to obtain a latent heat storage material composition having a melting point of within a range of 5° to 10° C.

The content of sodium sulfate decahydrate in the composition of the present invention is 65 to 85 wt %, and preferably 68 to 80 wt %. If the content is over 85 wt %, the blending amount of said melting point controlling agents becomes small, resulting in failure to lower the melting point of the composition to the range of 5° to 10° C. On the other hand, if the content is less than 65 wt %, the latent heat of melting becomes small, which is not preferable for the composition of the present invention.

The total content of the melting point controlling agents is 10 to 40 wt %, and preferably 15 to 35 wt %. Among the melting point controlling agents, ammonium chloride which acts most effectively is contained in an amount of between 1 to 20 wt %, and preferably between 4 to 15 wt % based on the total weight of the composition. If the content of ammonium chloride is not within this range, the resulting composition can not achieve a melting point in the range of 5° to 10° C.

Sodium bromide can lower the melting point of the latent heat storage material composition composed mainly of sodium sulfate decahydrate to about 10° C, by combining with ammonium chloride. The content of said sodium bromide is in the range of 1 to 20 wt %, and preferably between 4 to 15 wt %.

The effect of ammonium sulfate, which is optionally used as a melting point controlling agent, is weak compared to that of ammonium chloride and sodium bromide. However, it is found that the composition resulting from the addition of ammonium sulfate has an increased latent heat and is stable in behavior change during melting, probably due to the increase in ammonium ions and sulfate ions in the composition. The blending amount of ammonium sulfate is 1 to 20 wt %, preferably 4 to 15 wt %, and more preferably is an amount which is the same or less than that of sodium bromide.

The latent heat storage material composition of the present invention essentially comprises sodium sulfate decahydrate, ammonium chloride and sodium bromide, but may further contain ammonium sulfate as an additional component, and may contain a nucleating agent and a thickening agent.

Examples of the nucleating agent to be used in the present invention include sodium tetraborate decahydrate, silicates, cryolite and so on. Of these, sodium tetraborate decahydrate is most preferable. The blending amount of the nucleating agent is 0.1 to 10 wt %, and preferably 0.5 to 5 wt % based on the resulting composition weight.

Examples of the thickening agent to be used in the present invention include carboxymethyl cellulose, attapulgite clay, water-insoluble hydrogels, sodium alginate, gelatin, agar, wood pulp, silica gel, diatomaceous earth, and so on. Of these, carboxymethyl cellulose, attapulgite clay and water-insoluble hydrogels such as a crosslinked poly acrylate, a partially saponificated vinyl acetate/acrylate copolymer, a starch/acrylic acid graft copolymer or a cellulose graft polymer are preferable. The blending amount of the thickening agent is 0.1 to 10 wt %, and preferably 0.5 to 5 wt % based on the resulting composition weight. Through the use of the thickening agent a latent heat storage material composition exhibiting stable long-term recycling performance can be obtained.

The characteristic of the present invention exists in that the latent heat storage material composition comprises sodium sulfate decahydrate, ammonium chloride and sodium bromide in a specific blending ratio. The effects of the present invention cannot be obtained if even one component among said components is lacking or if a blending ratio which is outside of said specific blending ratio is used.

EXAMPLES

Examples 1 to 10

[Method for Preparation of Latent Heat Storage Material Compositions and Thermal Evaluation Thereof]

Sodium sulfate decahydrate, ammonium chloride, sodium bromide and ammonium sulfate were blended in the ratios shown in Table 1, followed by the further addition of sodium tetraborate decahydrate as a nucleating agent and a water-insoluble hydrogel (Sunwet IM-1000: trade name, produced by Sanyo Chemical Industries, Ltd.) as a thickening agent, each in an amount of 1.5 parts by weight based on 100 parts by weight of the blended salts. The resulting mixture was agitated with a mixer to prepare the compositions. At this time, it is very important to agitate the mixture sufficiently to form a homogeneous composition. If the mixture is not sufficiently agitated, the desired quantity of latent heat cannot be obtained.

The latent heat was measured for each of the resulting compositions at the temperature range of −10° to 40° C. using DSC. The temperature changing pattern was also measured by introducing 40 cc of each resulting composition into a 85-cc centrifugal sediment tube, then inserting a thermocouple in the center thereof, sealing the tube with a rubber plug, putting the sealed tube in a water bath, and finally subjecting this to freezing/melting recycling at between 1° C. and 11° C. The crystallizing point at freezing, freezing point and average melting point were also measured for each resulting composition. The results are shown in Table 1. Crystallizing point refers to the temperature where the metastable state is broken and crystallization occurs, and the average melting point refers to the average temperature between the melting starting point and end point. Freezing point refers to the maximum temperature that is reached by dissipating the latent heat as the metastable state is broken and the composition is frozen. The results are also shown in Table 1.

Comparative Examples 1 to 3

Three compositions were prepared in the same manner as the Examples described above. Thermal evaluation was carried out for each composition. The results are shown in Table 1.

TABLE 1

| | Example No. | | | | | | | | | | Comparative Example No. | | |
|---|---|---|---|---|---|---|---|---|---|---|---|---|---|
| | 1 | 2 | 3 | 4 | 5 | 6 | 7 | 8 | 9 | 10 | 1 | 2 | 3 |
| Composition (wt %) | | | | | | | | | | | | | |
| $Na_2SO_4 \cdot 10H_2O$ | 78.0 | 78.0 | 78.0 | 80.0 | 80.0 | 76.0 | 75.0 | 70.0 | 70.0 | 69.0 | 70.0 | 80.0 | 80.0 |
| $NH_4Cl$ | 12.0 | 10.0 | 8.0 | 10.0 | 8.0 | 6.0 | 5.3 | 12.0 | 10.3 | 11.3 | 24.0 | 10.0 | — |
| NaBr | 10.0 | 12.0 | 14.0 | 10.0 | 12.0 | 11.0 | 12.0 | 11.0 | 12.0 | 12.0 | 3.0 | — | 10.0 |
| $(NH_4)_2SO_4$ | — | — | — | — | — | 7.0 | 7.7 | 7.0 | 7.7 | 7.7 | 3.0 | 10.0 | 10.0 |

TABLE 1-continued

|  | Example No. | | | | | | | | | | Comparative Example No. | | |
| --- | --- | --- | --- | --- | --- | --- | --- | --- | --- | --- | --- | --- | --- |
|  | 1 | 2 | 3 | 4 | 5 | 6 | 7 | 8 | 9 | 10 | 1 | 2 | 3 |
| Properties |  |  |  |  |  |  |  |  |  |  |  |  |  |
| Quantity of latent heat of melting (cal/g) | 28.1 | 24.4 | 24.9 | 27.6 | 26.3 | 29.9 | 29.5 | 30.7 | 29.4 | 28.5 | 23.2 | 15.6 | 18.3 |
| Crystallizing point (°C.) | 3.3 | 3.0 | 3.2 | 3.5 | 3.3 | 3.3 | 3.1 | 3.0 | 3.1 | 3.2 | 3.6 | 3.1 | — |
| Average freezing point (°C.) | 4.4 | 4.2 | 4.3 | 4.6 | 4.3 | 4.4 | 4.2 | 4.0 | 4.2 | 4.2 | 4.9 | 4.4 | — |
| Average melting point (°C.) | 7.9 | 7.2 | 7.4 | 8.0 | 7.4 | 7.6 | 7.5 | 7.1 | 7.8 | 7.9 | 11.2 | 8.5 | — |

From the results, it was found that each composition for Examples 1 to 5, in which the blending ratio of sodium sulfate decahydrate, ammonium chloride and sodium bromide was within the range described in claim 1 and each composition for Examples 6 to 10, in which the blending ratio of sodium sulfate decahydrate, ammonium chloride, sodium bromide and ammonium sulfate was within the range described in claim 2, showed an average melting point in the range of 5° to 8° C., which is the desired temperature. The lowest latent heat of melting among those of the compositions of the Examples was 24.4 cal/g, which is converted to 36.6.cal/cm³ based on volume (calculated on the basis of the density of the composition being 1.50), and accordingly, even the composition showing the lowest latent heat of melting is an excellent latent heat storage material for practical use.

The composition of Comparative Example 1 was a quaternary composition of sodium sulfate decahydrate, ammonium chloride, sodium bromide and ammonium sulfate, wherein the amount of ammonium chloride was 24 wt % which lies outside of the range specified in claim 2. This commposition had an average melting point of 11.2° C., which is higher than the desired temperature, and thus was not suitable for use.

The composition of Comparative Example 2 was a ternary composition of sodium sulfate decahydrate, ammonium chloride and ammonium sulfate, excluding sodium bromide an essential component of the present invention. This composition showed an average melting point of 8.5° C. which is within the desired temperature range, but which is higher than those of the Examples. Furthermore, the composition had a stored heat of only 15.6 cal/g which is not sufficient for practical use.

The composition of Comparative Example 3 was a ternary composition of sodium sulfate decahydrate, sodium bromide and ammonium sulfate, excluding ammonium chloride, an essential component of the present invention. When the latent heat of melting was measured by DSC, the composition had two melting peaks, one at around 12° C. and one at 25° C. exhibiting a very broad melting pattern, and therefore, this composition did not have a distinct melting point. Further, the composition had a low latent heat of 18.3 cal/g.

[Test for Long-term Stability of Latent Heat Storage Materials]

In order to reproduce actual conditions, the sample of Example 8 was charged in a resin-made ball (diameter: 67 mm) in an amount of 70 g, and the temperature change at the ball center was measured and recorded by using a thermocouple. Next, the temperature of the water bath containing the ball was controlled for freezing and melting between 1° and 11° C., and this freezing/melting heat cycle was repeated 100 times. The freezing/melting heat pattern of each sample after the cycle is shown in FIG. 1.

From FIG. 1, the following results and considerations are given.

That is, in FIG. 1, the period between hour 0 and hour 9 is the period in which the freezing process occurs. During this process, the water bath was cooled to 1° C. over one hour, and maintained at 1° C. for eight hours. The composition of Example 8 was subjected to a decreasing temperature until hour 2 from the start without any change of state. At the hour 2 point, the metastable supercooling state of the sample was broken and crystallization began. From this point in order to release the latent heat of freezing, the sample was subjected to an increasing temperature and the crystallization proceeded. The temperature of the sample became equal to that of the water bath in about five hours after the latent heat of freezing was released and the crystallization finished.

In FIG. 1, the period between hour 9 and hour 17 is the period in which the melting process occurs. During the hour between hour 9 and hour 10, the water bath was warmed to about 11° C. and maintained at such a temperature for eight hours. The temperature of the composition increased from the starting point of the melting process until one hour had passed without any change of state. Then at that point after which a total of ten hours had passed melting began and continued until hour 14. Once the melting had finished, the temperature of the sample became equal to that of the water bath. Over this period, the sample melted at from 6.8° to 7.4° C. (an average melting point of 7.1° C.) and the melting curve extended parallel to the time axis at temperatures near the melting point (from hour 11 until hour 14), which suggests that the composition stably released large amounts of stored heat as latent heat of melting. When the stored heat of the sample given after repeating the freezing/melting heat cycle 100 times was measured using DSC, the stored heat had decreased from 30.7 cal/g to 27.2 cal/g which is still, however, a large amount of stored heat. The stored heat of the composition of Example 8 thus decreased by 11% compared to the initial value.

The latent heat storage material composition according to the present invention has a melting point of 5° to 8° C., which is extremely preferable for large latent heat of melting, exhibits the superior effect of heat recycling stability in long-term performance and, as it is capable of heat storage by water in contrast to heat storage by ice, is high in practicality.

What is claimed is:

1. A latent heat storage material composition having a melting point in the range of 5° to 10° C. and consisting essentially of 68 to 80 wt % of sodium sulfate decahydrate, 4 to 15 wt % of ammonium chloride and 4 to 15 wt % of sodium bromide.

2. The composition according to claim 1 having a latent heat of melting of 24.4 to 30.7 cal/g.

3. A latent heat storage material composition having a melting point in the range of 5° to 10° C. and consisting essentially of 68 to 80 wt % of sodium sulfate decahydrate, 4 to 15 wt % of ammonium chloride, 4 to 15 wt % of sodium bromide, 0.1 to 10 wt % of at least one nucleating agent selected from the group consisting of sodium tetraborate decahydrate, silicates and cryolite, and 0.1 to 10 wt % of at least one thickening agent selected from the group consisting of carboxymethyl cellulose, attapulgite clay and water-insoluble hydrogels.

4. The composition according to claim 3 having a latent heat of melting of 24.4 to 30.7 cal/g.

5. The composition according to claim 3, wherein the nucleating agent is sodium tetraborate decahydrate.

6. The composition according to claim 3, wherein the thickening agent is a water-insoluble hydrogel.

7. A latent heat storage material composition having a melting point in the range of 5° to 10° C. and consisting essentially of 68 to 80 wt % of sodium sulfate decahydrate, 4 to 15 wt % of ammonium chloride, 4 to 15 wt % of sodium bromide and 4 to 15 wt % of ammonium sulfate.

8. The composition according to claim 7, wherein the content of ammonium sulfate is equal to or less than that of sodium bromide.

9. The composition according to claim 7 having a latent heat of melting of 24.4 to 30.7 cal/g.

10. A latent heat storage material composition having a melting point in the range of 5° to 10° C. and consisting essentially of 68 to 80 wt % of sodium sulfate decahydrate, 4 to 15 wt % of ammonium chloride, 4 to 15 wt % of sodium bromide, 4 to 15 wt % of ammonium sulfate, 0.1 to 10 wt % of at least one nucleating agent selected from the group consisting of sodium tetraborate decahydrate, silicates and cryolite, and 0.1 to 10 wt % of at least one thickening agent selected from the group consisting of carboxymethyl cellulose, attapulgite clay and water-insoluble hydrogels.

11. The composition according to claim 10, wherein the content of ammonium sulfate is equal to or less than that of sodium bromide.

12. The composition according to claim 10 having a latent heat of melting of 24.4 to 30.7 cal/g.

13. The composition according to claim 10, wherein said nucleating agent is sodium tetraborate decahydrate.

14. The composition according to claim 10, wherein said thickening agent is a water-insoluble hydrogel.

* * * * *